United States Patent
Kondreddy et al.

(10) Patent No.: US 10,715,420 B2
(45) Date of Patent: Jul. 14, 2020

(54) SYSTEM, METHOD AND APPARATUS FOR IMPLEMENTING FAST REROUTE (FRR)

(71) Applicant: HUAWEI TECHNOLOGIES CO., LTD., Shenzhen, Guangdong (CN)

(72) Inventors: Venugopal Reddy Kondreddy, Bangalore (IN); Vinod Kumar Selvaraj, Bangalore (IN)

(73) Assignee: HUAWEI TECHNOLOGIES CO., LTD., Shezhen, Guangdong (CN)

( * ) Notice: Subject to any disclaimer, the term of this patent is extended or adjusted under 35 U.S.C. 154(b) by 0 days.

(21) Appl. No.: 16/111,962

(22) Filed: Aug. 24, 2018

(65) Prior Publication Data

US 2019/0075016 A1 Mar. 7, 2019

Related U.S. Application Data

(63) Continuation of application No. PCT/CN2017/074150, filed on Feb. 20, 2017.

(30) Foreign Application Priority Data

Feb. 27, 2016 (IN) .............................. 201641006855

(51) Int. Cl.
*H04L 12/707* (2013.01)
*H04L 12/24* (2006.01)
(Continued)

(52) U.S. Cl.
CPC .......... *H04L 45/22* (2013.01); *H04L 41/0654* (2013.01); *H04L 41/0659* (2013.01);
(Continued)

(58) Field of Classification Search
CPC ......... H04L 45/22; H04L 45/28; H04L 45/50; H04L 41/0659; H04L 41/0654; H04L 41/0668; H04L 69/40
See application file for complete search history.

(56) References Cited

U.S. PATENT DOCUMENTS 8,885,463 B1 * 11/2014 Medved ................. H04L 45/50
370/228
2006/0159009 A1 7/2006 Kim et al.
(Continued)

FOREIGN PATENT DOCUMENTS

AR 083663 A1 3/2013
CN 1805412 A 7/2006
(Continued)

OTHER PUBLICATIONS

E. Crabbe et al. "PCEP Extensions for PCE-initiated LSP Setup in a Stateful PCE Model," PCE Working Group, draft-ietf-pce-pce-initiated-lsp-05, Oct. 19, 2015. (Year: 2015).*
(Continued)

*Primary Examiner* — Joshua Kading
(74) *Attorney, Agent, or Firm* — Womble Bond Dickinson (US) LLP

(57) ABSTRACT

The present disclosure provides system, method and apparatus for implementing fast reroute (FRR). The present disclosure provides a mechanism to associate working LSPs with a FRR LSP to protect against the node/link failures and can switch the traffic immediately upon LSP failure. Further, the present disclosure enables to communicate the status of FRR in use to the PCE so as to have centralized control over the FRR mechanism.

17 Claims, 9 Drawing Sheets

(51) Int. Cl.
*H04L 12/721* (2013.01)
*H04L 12/703* (2013.01)
*H04L 12/723* (2013.01)
*H04L 12/717* (2013.01)

(52) U.S. Cl.
CPC .......... *H04L 41/0668* (2013.01); *H04L 45/26* (2013.01); *H04L 45/28* (2013.01); *H04L 45/42* (2013.01); *H04L 45/50* (2013.01)

(56) References Cited

U.S. PATENT DOCUMENTS

| | | |
|---|---|---|
| 2010/0208733 A1 | 8/2010 | Zhao et al. |
| 2011/0199939 A1 | 8/2011 | Zi et al. |
| 2013/0336103 A1 | 12/2013 | Vasseur et al. |
| 2013/0336116 A1* | 12/2013 | Vasseur ................ H04L 45/125 370/235 |
| 2014/0330920 A1 | 11/2014 | Shao |
| 2015/0003283 A1* | 1/2015 | Previdi .................. H04L 41/12 370/254 |
| 2015/0103844 A1* | 4/2015 | Zhao ...................... H04L 45/42 370/410 |
| 2015/0146536 A1* | 5/2015 | Minei ................... H04L 45/507 370/236 |
| 2015/0215201 A1 | 7/2015 | Nakash et al. |
| 2017/0012895 A1* | 1/2017 | Zhao .................... H04L 47/724 |

FOREIGN PATENT DOCUMENTS

| | | |
|---|---|---|
| CN | 101056268 A | 10/2007 |
| CN | 101237409 A | 8/2008 |
| CN | 102611629 A | 7/2012 |
| CN | 102638393 A | 8/2012 |
| CN | 103647711 A | 3/2014 |
| CN | 104185970 A | 12/2014 |
| CN | 104253746 A | 12/2014 |
| CN | 104469560 A | 3/2015 |
| CN | 105187225 A | 12/2015 |
| DE | 102015201144 A1 | 7/2015 |
| EP | 2658168 B1 | 9/2015 |
| JP | 2011524728 A | 9/2011 |
| WO | 2010048859 A1 | 5/2010 |
| WO | 2012062386 A1 | 5/2012 |
| WO | 2012171191 A1 | 12/2012 |

OTHER PUBLICATIONS

E. Crabbe et al, PCEP Extensions for Stateful PCE draft-ietf-pce-stateful-pce-11. Apr. 20, 2015, 47 pages.
I. Minei et al, PCEP Extensions for Establishing Relationships Between Sets of LSPs draft-minei-pce-association-group-02, Jul. 6, 2015, 11 pages.
P. Pan et al, Fast Reroute Extensions to RSVP-TE for LSP Tunnels. RFC4090, May 2005, 38 paegs.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |           Flags             |R|
+-+-+-+-+-+-+-+-+-+-+-+-+-+-+-+-+-+-+-+-+-+-+-+-+-+-+-+-+-+-+-+-+
|                      Association ID                           |
+-+-+-+-+-+-+-+-+-+-+-+-+-+-+-+-+-+-+-+-+-+-+-+-+-+-+-+-+-+-+-+-+
|                    IPv4 Association Source                    |
+-+-+-+-+-+-+-+-+-+-+-+-+-+-+-+-+-+-+-+-+-+-+-+-+-+-+-+-+-+-+-+-+
//                       Optional TLVs                         //
+-+-+-+-+-+-+-+-+-+-+-+-+-+-+-+-+-+-+-+-+-+-+-+-+-+-+-+-+-+-+-+-+
```

[ASSOCIATION OBJECT TYPE 1 FOR IPv4]

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |           Flags             |R|
+-+-+-+-+-+-+-+-+-+-+-+-+-+-+-+-+-+-+-+-+-+-+-+-+-+-+-+-+-+-+-+-+
|                      Association ID                           |
+-+-+-+-+-+-+-+-+-+-+-+-+-+-+-+-+-+-+-+-+-+-+-+-+-+-+-+-+-+-+-+-+
|                                                               |
|                    IPv6 Association Source                    |
|                                                               |
|                                                               |
+-+-+-+-+-+-+-+-+-+-+-+-+-+-+-+-+-+-+-+-+-+-+-+-+-+-+-+-+-+-+-+-+
//                       Optional TLVs                         //
+-+-+-+-+-+-+-+-+-+-+-+-+-+-+-+-+-+-+-+-+-+-+-+-+-+-+-+-+-+-+-+-+
```

[ASSOCIATION OBJECT TYPE 1 FOR Ipv4]

FIGURE 4

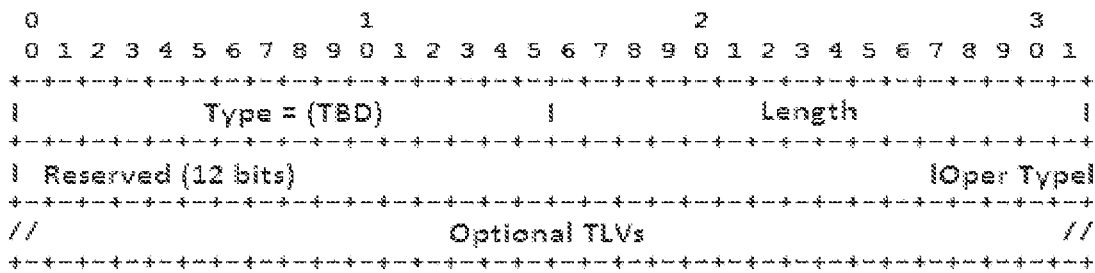
[FRR Bind tlv]
FIGURE 5
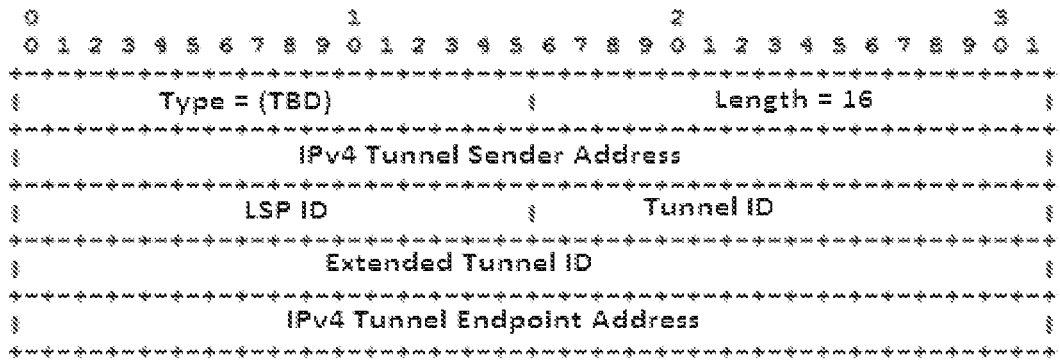
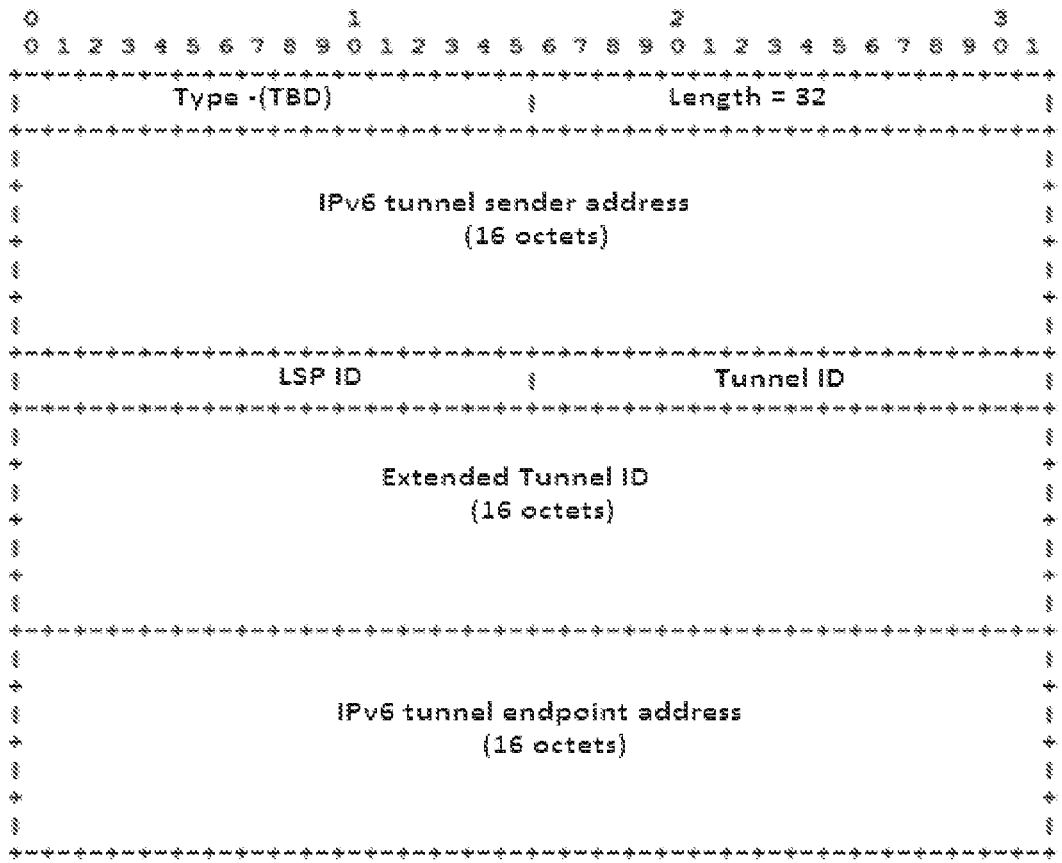
FIGURE 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type= (TBD)               |           Length              |
+-+-+-+-+-+-+-+-+-+-+-+-+-+-+-+-+-+-+-+-+-+-+-+-+-+-+-+-+-+-+-+-+
|                          Flags                              |F|
+-+-+-+-+-+-+-+-+-+-+-+-+-+-+-+-+-+-+-+-+-+-+-+-+-+-+-+-+-+-+-+-+
```

【FRR Flag tlv】

SYSTEM, METHOD AND APPARATUS FOR IMPLEMENTING FAST REROUTE (FRR)

CROSS-REFERENCE TO RELATED APPLICATIONS

This application is a continuation of International Application No. PCT/CN2017/074150, filed on Feb. 20, 2017, which claims priority to Indian Patent Application No. 201641006855, filed on Feb. 27, 2016. The disclosures of the aforementioned applications are hereby incorporated by reference in their entireties.

TECHNICAL FIELD

The present subject matter described herein, in general, relates to networking technologies, and for local protection of Multiple Protocol Label Switch (MPLS) network, and more particularly, to system, method, and apparatus for implementing fast reroute (FRR) of service provisioning for efficiently performing a failover from a protected connection to its backup connection when a network event is detected affecting the protected connection.

BACKGROUND

The time critical applications like public switched telephone network (PSTN calls are affected when the network re-converges due to faults. Fast Reroute (FRR) is a technology used in networking to ensure the service availability is assured. FRR is the technology proposed by Internet Engineering Task Force (IETF) for local protection of a MPLS network. The technology provides fast protection switching capability for a Label Switched Path (LSP) by means of traffic engineering capability of the MPLS.

In MPLS, a connection referred to as a label switched path (LSP) is established between two end points and packets are transported along the LSP using label switching. Various signaling protocols may be used to set up and manage LSPs. Examples include Resource Reservation Protocol (RSVP) and its various extensions such as RSVP-TE for traffic engineering, and others. RSVP-TE provides a mechanism for reserving resources for LSPs. Resource Reservation Protocol-Traffic Engineering is an extension of the resource reservation protocol (RSVP) for traffic engineering. It supports the reservation of resources across an IP network.

Routers that are capable of performing label-based switching according to the MPLS protocol are referred to as label switch routers (LSRs). The entry and exit points of an MPLS network are called label edge routers (LERs). The entry router is referred to as ingress LER and the exit router as an egress LER. LSPs are unidirectional tunnels that enable a packet to be label switched through the MPLS network from ingress LER to an egress LER. The flow of packets along an LSP may be disrupted by various network events such as failure of an interface or link along a path traversed by an LSP, failure of a node (e.g., a router) in the LSP path, reduction in bandwidth associated with a link traversed by the LSP, a priority-related event such as when a new high priority LSP comes up and there is bandwidth contention or a change in priority of an existing LSP, which may result lower priority LSPs to get preempted, and others. To protect against potential data losses caused by such disruptions, a backup LSP may be provisioned for an LSP (referred to as the primary LSP to differentiate it from the backup LSP). The backup LSP provides an alternative path for forwarding packets around a failure point in the primary LSP. Since the primary LSP is "protected" by its corresponding backup LSP, the primary LSP is referred to as a protected LSP.

The Fast ReRoute (FRR) extension to RSVP-TE provides a mechanism for establishing backup LSPs for protecting primary LSPs. The protected LSP is also referred to as an FRR-enabled LSP. When a network event occurs that affects a protected LSP, the packet traffic is locally redirected along the backup LSP in a manner that circumvents the failure point in the protected LSP. When a router starts redirecting data along a backup LSP for a protected LSP, the protected LSP is referred to as being failed over to the backup LSP. FRR enables RSVP to set up a backup LSP to protect an LSP so that in the event of a network failure (e.g., link/node failure), the data traffic from the protected LSP can be switched to the backup LSP to minimize any traffic loss. RSVP-TE on the local device, such as router, associates the working or current LSPs to a FRR (facility backup) LSP based on local FRR configuration and RSVP-TE signaling messages (such as RSVP path and resv messages) exchange. The path message for the LSP to be protected specifies the desired protection, and the resv message propagated towards ingress of the LSP specifies the level of protection available along the path.

The software-defined networking (SDN) is one of the recent approaches to computer networking that allows network administrators to manage network services through abstraction of higher-level functionality. This is done by decoupling the system that makes decisions about where traffic is sent (the control plane) from the underlying systems that forward traffic to the selected destination. Generally, the SDN networks are path computation element (PCE)/path computation client (PCC) managed. The PCE is a system component, application, or network node that is capable of determining and finding a suitable route for conveying data between a source and a destination. The PCE device can be a router, a COTS server, part of the OSS, or a virtualized entity running in a cloud. When a network node needs a path for an LSP, it makes a request to the PCE using the PCE protocol (PCEP). The PCE has access to topology information for the entire network and uses this in path computations.

However, the RSVP-TE does not ensure a central control of associating working and FRR (facility backup) LSPs at a particular node. Also, in SDN environment where the LSPs are PCE initiated, and in PCE methods where RSVP signaling for LSPs is completely removed, cannot use the existing FRR mechanisms of RSVP-TE. Further, in case of PCE managed SDN network, there is no mechanism for either PCC or PCE to associate the working/current LSPs (i.e., LSPs to be protected) to FRR LSP, and switch the traffic to FRR LSP (i.e., put FRR LSP in use) upon resource (node/link) failure, due to which the status of FRR LSP in use is not updated with the PCE. Furthermore, when the working LSPs and FRR LSP are delegated to PCE, the PCE does not have the information to group the working LSPs and FRR LSPs so as to ensure the protection of working LSP. Also, when the working LSP is initiated by PCE, there is no means for PCE to initiate the FRR LSP and protect the working LSPs.

SUMMARY

This summary is provided to introduce concepts related to system, method and apparatus for implementing fast reroute (FRR), and are further described below in the detailed description. This summary is not intended to identify essential features of the claimed subject matter nor is it intended for use in determining or limiting the scope of the claimed subject matter.

In view of the technical problems as recited in the background section above, it may be useful to associate the working LSP(s) with the FRR LSP. Further, it may also be useful to send a FRR LSP in use status to the PCE, so that PCE can re-optimize the working LSPs.

In order to provide a technical solution to the above mentioned technical problems, one aspect of the present disclosure is to provide a system, method and apparatus for associating the working LSP(s) with the FRR LSP, and thereby report the FRR LSP in use status to the PCE, so that the PCE can re-optimize the working LSPs.

Another aspect of the present disclosure is to provide a system, method and apparatus that communicate using a new association type (FRR) defined in association object.

Another aspect of the present disclosure is to provide a system, method and apparatus that communicate using a FRR Bind and FRR Flags Type, length, value (TLVs) defined to be carried in the association object.

Yet another aspect of the present disclosure is to provide a system, method and apparatus that extend the PCEP mechanisms to associate set of working LSPs to a FRR LSP, which includes cases of either PCC or PCE having the ownership of association.

Still another aspect of the present disclosure is to provide a system, method and apparatus for reporting the working LSP's traffic switch to FRR LSP to the PCE.

Accordingly, in one implementation, to associate the working LSP(s) with the FRR LSP, a point of local repair (PLR) acting as PCC, according to the present disclosure, reports/delegates the FRR LSP to a PCE in a path computation report (PCRpt) message. The PCRpt message contains an association object with an additional FRR Bind TLV. The bind TLV includes at least the LSP-identifiers TLVs that are being protected by a backup LSP.

In one implementation, a PCE sends a path computation update (PCUpd) message/path computation Initiate (PCInitiate) message of FRR LSP to the PLR. The PCInitiate message includes the association object with FRR Bind TLV containing LSP-Identifiers TLV of LSPs which are to be protected by the backup LSP.

In one implementation, to report FRR LSP in use status to PCE, so that PCE can re-optimize the working LSPs, the present disclosure enables to send a FRR_IN_USE (F) bit in FRR flags TLV of association object set in PCRpt message from PLR to PCE, to specify FRR is currently in use.

In one implementation, a system for implementing a fast reroute (FRR) using a Path Computation Element Protocol (PCEP) is disclosed. The system comprises at least one ingress router configured to communicate at least a path computation report (PCRpt) message to at least one Path Computation Element (PCE), the PCRpt message comprise at least an information associated with a working label switched path (LSP); at least one other router configured to communicate at least a path computation report (PCRpt) message to the PCE, the PCRpt message comprise at least an information associated with a fast reroute (FRR) LSP having an association object with an optional Type, length, value (TLV) (the TLV is carried in an optional field of the at least one PCRpt message in the specification); wherein the PCE is configured to communicate at least a path computation update (PCUpd) message to at least the ingress router, the PCUpd message comprise at least a newly computed LSP path for the working LSP whose traffic is affected due to link and/or node failure.

In one implementation, a system for implementing a fast reroute (FRR) using a Path Computation Element Protocol (PCEP) is disclosed. The system comprises at least a Path Computation Element (PCE) configured to communicate at least a path computation initiate (PCInitiate) message to at least one ingress router, the PCInitiate message triggers creations of at least a working label switched path (LSP) at the ingress router; at least one ingress router configured to communicate, upon receipt of the PCInitiate message, at least a path computation report (PCRpt) message to the PCE, the PCRpt message comprise at least an information associated with a working label switched path (LSP) created; at least one other router, upon receipt of the a PCInitiate message, configured to create at least a FRR LSP, and communicate at least a path computation report (PCRpt) message to the PCE, the PCRpt message comprise at least an information associated with the fast reroute (FRR) LSP having an association object with an optional Type, length, value (TLV) (the TLV is carried in an option field of the at least one PCRpt message in the specification). The PCE is configured to receive the PCRpt message, update the working LSP to be protected based on the information associated with the working label switched path (LSP) and the information associated with the FRR LSP; and thereby communicate, upon detection of at least a link and/or a node failure, at least a path computation update (PCUpd) message to at least the ingress router, the PCUpd message comprise at least a newly computed LSP path for the working LSP whose traffic is affected due to link and/or node failure.

In one implementation, in case of PCE initiated FRR LSP, the PCUpd message to the PLR (other router) comprise an association object with FRR Bind TLV having new working LSPs (LSP-Identifiers TLV) which are setup after the association is established. Further, the PLR can add these new working LSPs to a same association group as already existing. The PLR (other router) PCRpt message can comprise an association object with the FRR Bind TLV having these working LSP's LSP-Identifiers TLV.

As compared to the prior-art techniques, the present disclosure achieves technical advancement by associating working LSPs with a FRR LSP to protect against the node/link failures. This association of the working LSPs with a FRR LSP enables switching the traffic immediately upon LSP failure. Further, the present disclosure also enables to communicate the FRR LSP in use to a centralized controlling mechanism responsible for rerouting of the traffic. Such as PCE.

BRIEF DESCRIPTION OF THE ACCOMPANYING DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 4 illustrates a format of association object type, in accordance with an embodiment of the present subject matter.

FIG. 5 illustrates a format of FRR bind Tlv, in accordance with an embodiment of the present subject matter.

FIG. 6 illustrates LSP Identifiers TLVs for IPv4 and IPv6, in accordance with an embodiment of the present subject matter.

Figure 1:
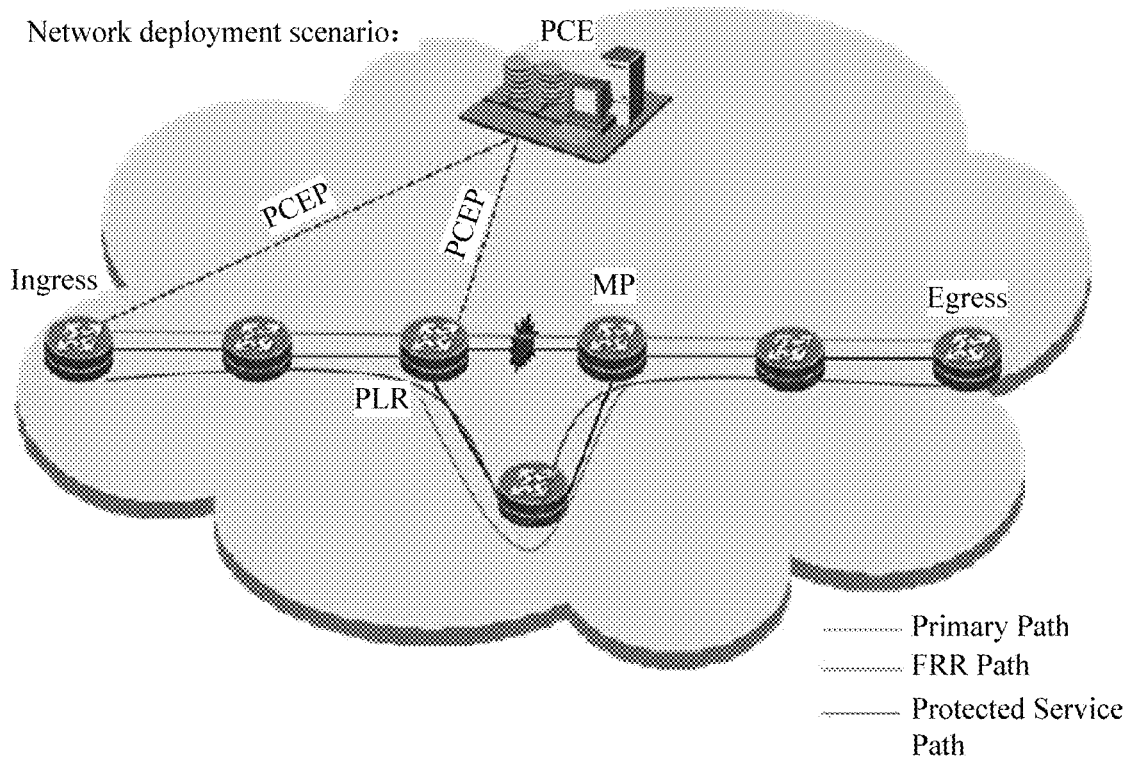
FIG. 1 illustrates a network deployment scenario.

It is to be understood that the attached drawings are for purposes of illustrating the concepts of the disclosure and may not be to scale.

DETAILED DESCRIPTION

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The disclosure can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the disclosure may take, may be referred to as techniques. In general, the order of the blocks of disclosed processes may be altered within the scope of the disclosure.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

System, method, and apparatus for implementing fast reroute (FRR) of service provisioning for efficiently performing a failover from a protected connection to its backup connection when a network event is detected affecting the protected connection are disclosed.

While aspects are described for system, method, and apparatus for implementing fast reroute (FRR) of service provisioning for efficiently performing a failover from a protected connection to its backup connection when a network event is detected affecting the protected connection, the present disclosure may be implemented in any number of different computing systems, environments, and/or configurations, the embodiments are described in the context of the following exemplary systems, apparatus, and methods.

In one implementation, the present disclosure enables to associate the working LSP(s) with the FRR LSP with efficient and reliable PCEP communication.

In one implementation, the present disclosure enables reporting FRR LSP in use status to PCE. So that PCE can re-optimize the working LSPs.

In one implementation, the present disclosure defines new association type (FRR) in an association object used for PCE communication.

In one implementation, the present disclosure provides FRR Bind TLVs and FRR Flags TLVs to be carried in the association object.

Referring now to FIG. 1, a network deployment scenario is disclosed. As shown in FIG. 1, all the routers in the network are connected in stateful PCEP session with PCE. For the ease of understanding, as shown in FIG. 1, the PCEP sessions are only shown between ingress to PCE and PLR to PCE. When a primary LSP is setup from an ingress to an egress, to the protect LSP traffic along its path, each node along the path should ensure to protect the LSP by rerouting the traffic around the failed resource (node/link failure). To reroute the traffic upon failure, each node should pre-setup a LSP excluding the possible failed resource (i.e., excluding outgoing interface and/or next immediate node) along the path. This LSP is called FRR LSP, and the node which creates this LSP is called PLR. Once the FRR LSP is setup, it is bound with primary LSP, so that ingress traffic can be switched to FRR LSP upon failure detection at PLR.

However, as already discussed, currently the PCEP has no mechanism to associate the working LSP(s) with the FRR LSP. Further, the currently available PLRs have no mechanism to report FRR LSP in use status to PCE, so that PCE can re-optimize the working LSPs.

In order to avoid the above technical problems available in the conventional art, the present disclosure provides a mechanism to associate the working LSP(s) with the FRR LSP. Further, the present disclosure also provides a mechanism to report the FRR LSP in use status to PCE, so that PCE can re-optimize the working LSPs.

Figure 2:
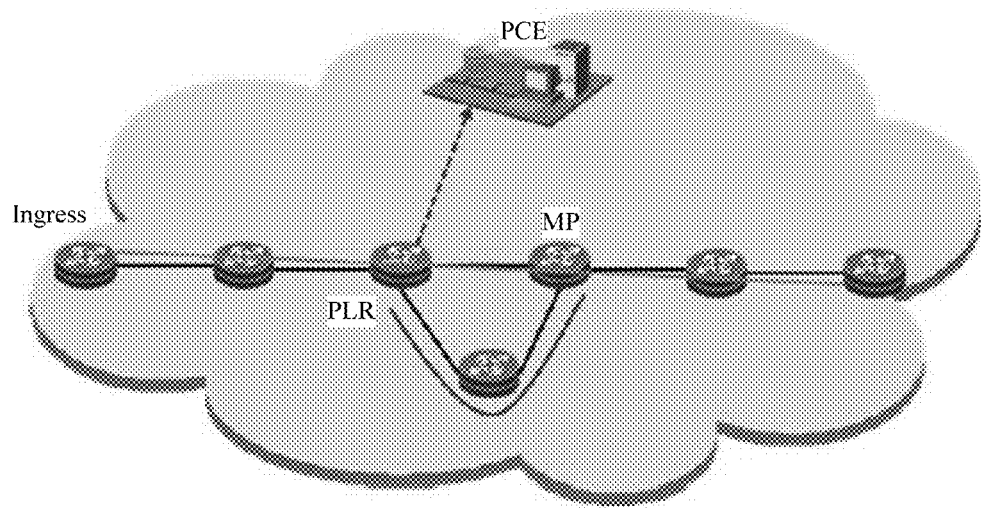
FIG. 2 illustrates a point of local repair (PLR) reporting communication with the PCE, in accordance with an embodiment of the present subject matter.

Referring now to FIG. 2, a point of local repair (PLR) reporting communication with the PCE, in accordance with an embodiment of the present subject matter is disclosed. As shown in FIG. 2, a point of local repair (PLR) acts as PCC reports/delegates FRR LSP to PCE in PCRpt message. The PCRpt message contains an association object with FRR Bind TLVs. This bind tlv includes the LSP-identifiers TLVs that are being protected by this facility backup LSP. It may be understood by the person skilled in the art that, LSP-identifiers TLVs are same as IPV4-LSP-IDENTIFIERS TLV or IPV6-LSP-IDENTIFIERS TLV. It is a convention to use LSP-identifiers TLV to specify that it can be either IPV4 identifiers or IPV6 identifiers. A format of IPV4-LSP-IDEN-TIFIERS TLV or IPV6-LSP-IDENTIFIERS TLV in the document.

The mechanism as shown in FIG. 2, enables the PLR to report the FRR LSP in use status to PCE, so that PCE can re-optimize the working LSPs. This avoids the drawbacks as recited in the background section above.

Figure 3:
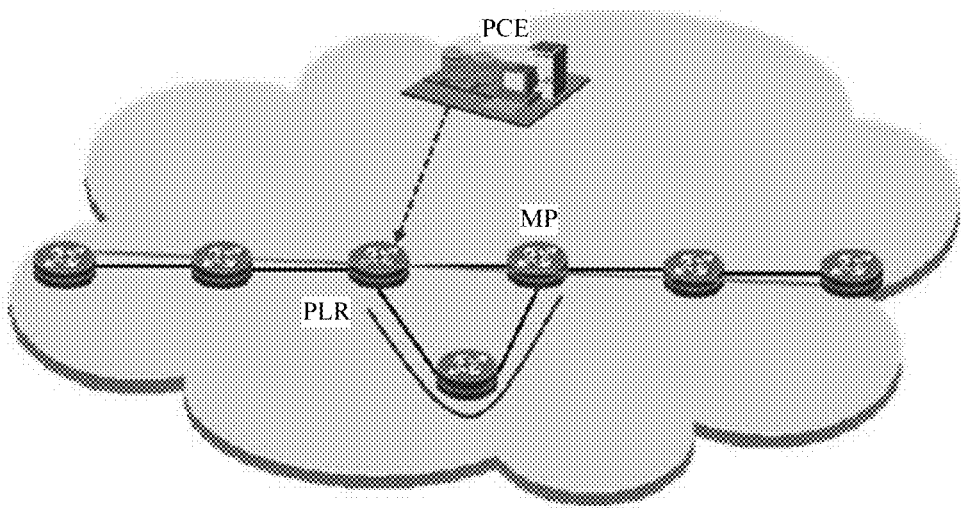
FIG. 3 illustrates a PCE acknowledgement communication with the PLR, in accordance with an embodiment of the present subject matter.

Referring now to FIG. 3 illustrates a PCE acknowledgement communication with the PLR, in accordance with an embodiment of the present subject matter. As show in FIG. 3, the PCE sends PCUpd/PCInitiate message of FRR LSP to the PLR. The PCE includes the association object with FRR Bind TLV containing LSP-identifiers TLVs of LSPs which are to be protected by this facility backup LSP.

In one implementation, the present disclosure enables to add new types in the TLV fields to mention the FRR Association, Optional TLVs, to convey LSP identifiers of the working LSP(s) and the current FRR status to the PCE.

In one implementation, as shown in FIG. 4, the format of association object body may be same as defined in PCEP extensions for establishing relationships between sets of LSPs draft-minei-pce-association-group-02, by PCE working group draft-minei-pce-association-group-03.

As shown in FIG. 4, ASSOCIATION Object-Type is 1 for IPv4 and associated format and ASSOCIATION Object-Type is 2 for IPv6 and associated format.

In one implementation, FIG. 5 shown an exemplary TLV format as per the present disclosure. The optional TLVs may include FRR Bind TLV which is newly defined as per the present disclosure, and the LSP Identifiers TLVs, which may be the existing TLVs.

The FRR bind TLV may be used to convey the working LSPs information bound to this FRR association. It may be a top level TLV. The LSP identifiers TLVs may be an existing TLV. This TLV may be carried as sub-TLV in FRR Bind TLV.

In one implementation, as shown in FIG. 5, the OperType field specifies add/delete operation for the LSP path or any of its identifiers. The value of ADD may be 1 and DELETE may be 2, and the OperType 0 is reserved.

In one implementation, as shown in FIG. 5, the optional LSP identifiers TLVs may be carried as sub-tlvs in FRR bind TLV.

In one implementation, each time the FRR Bind TLV is encoded, it may not contain all the LSP identifiers as sub-TLV. It may include only newly added working LSPs that may be used for association and deletion of the existing working LSPs from association. For example, at most, 2 FRR Bind TLVs can be present in the object (i.e., one with operType ADD and other with OperType DELETE). All the working LSPs deletion from the association may be considered as a special case with FRR bind TLVS OperType as DELETE and no optional sub-TLVs in it.

FIG. 6 illustrates LSP Identifiers TLVs for IPv4 and IPv6, in accordance with an embodiment of the present subject matter. In one implementation, the LSP Identifiers, is existing TLV. It may either be IPV4-LSP-IDENTIFIERS TLV or IPV6-LSP-IDENTIFIERS TLV. This TLV is carried as sub-TLV in FRR Bind TLV. There may be multiple sub-tlvs in one FRR Bind tlv. Each LSP Identifiers sub-TLV identifies a working LSP. This TLV is defined in PCEP Extensions for Stateful PCE (https://datatrackerietf.org/doc/draft-ietf-pce-stateful-pce/).

In one implementation, in order to avoid the drawback of no mechanism to report FRR LSP in use status to PCE. So that PCE can re-optimize the working LSPs, the present disclosure as shown in FIG. 2 provides a mechanism to communicate the status report of the FRR LSP in use to PCE.

In one implementation, in order to achieve the status reporting the present disclosure may use FRR_IN_USE(F) bit in FRR flags TLV of association object is set in report message from PLR to PCE, to specify FRR is currently in use.

Figures 7, 8:
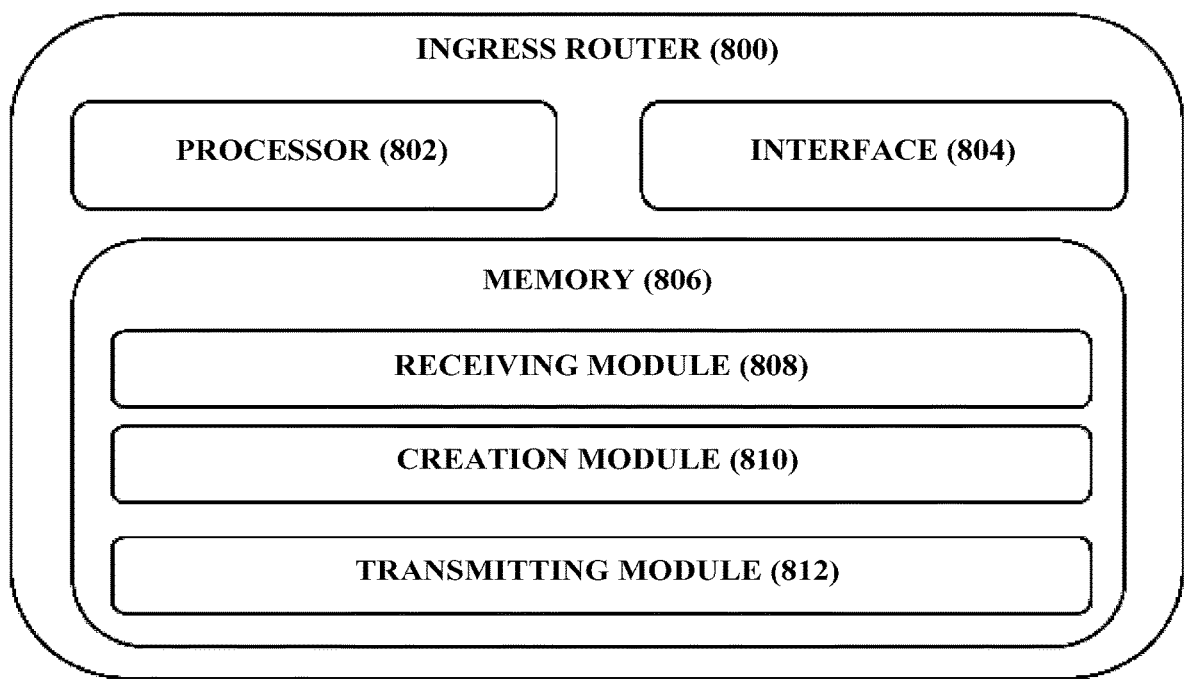
FIG. 7 illustrates an FRR Flags Tlv, in accordance with an embodiment of the present subject matter.
FIG. 8 illustrates an apparatus, preferably an ingress router, for implementing a fast reroute (FRR) using a Path Computation Element Protocol (PCEP) in accordance with an embodiment of the present subject matter.

FIG. 7 illustrates the FRR flags TLV used to specify FRR flags. In one implementation, one bit is defined to convey FRR_IN_USE status. The FRR_IN_USE indicates the outage of the protected link and working LSPs traffic is switched to FRR LSP.

FIG. 8 illustrates an apparatus 800, preferably an ingress router, for implementing a fast reroute (FRR) using a Path Computation Element Protocol (PCEP) in accordance with an embodiment of the present subject matter.

Figure 9:
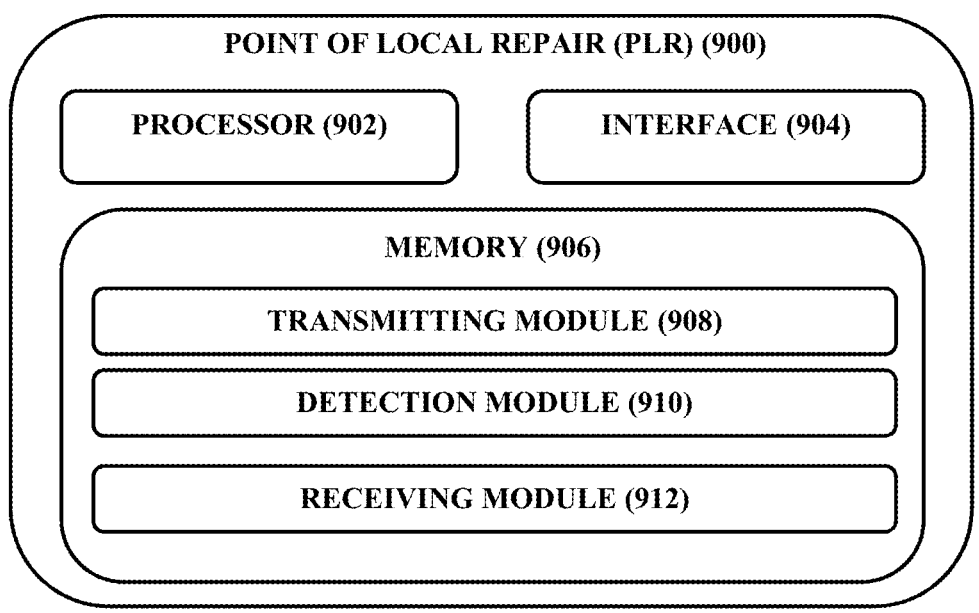
FIG. 9 illustrates an apparatus, preferably a Point of Local Repair (PLR), for implementing a fast reroute (FRR) using a Path Computation Element Protocol (PCEP) in accordance with an embodiment of the present subject matter.

FIG. 9 illustrates an apparatus 900, preferably a Point of Local Repair (PLR), for implementing a fast reroute (FRR) using a Path Computation Element Protocol (PCEP), in accordance with an embodiment of the present subject matter.

Figure 10:
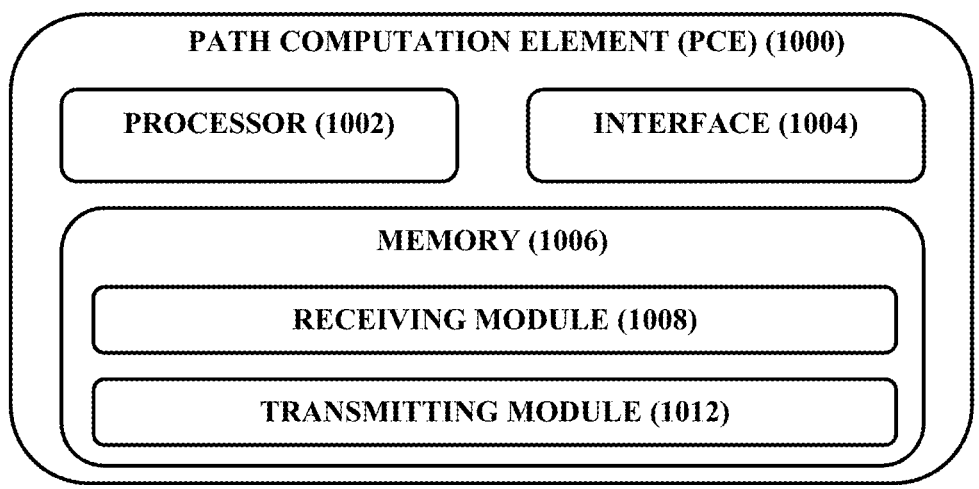
FIG. 10 illustrates an apparatus, preferably a Path Computation Element Protocol (PCEP), in accordance with an embodiment of the present subject matter.

FIG. 10 illustrates an apparatus 1000, preferably a Path Computation Element (PCE), for implementing a fast reroute (FRR) using a Path Computation Element Protocol (PCEP), in accordance with an embodiment of the present subject matter.

Although the present subject matter is explained considering that the apparatus 800/900/1000 for implementing a fast reroute (FRR) using a Path Computation Element Protocol (PCEP) it may be understood that the apparatus 800/900/1000 may also be implemented in a variety of computing systems, such as a laptop computer, a desktop computer, a notebook, a workstation, a mainframe computer, a server, a network server, and the like. It will be understood that the apparatus 800/900/1000 may be accessed by multiple users through one or more user devices (not shown) or applications residing on the user devices. Examples of the apparatus 800/900/1000 may include, but are not limited to, a portable computer, a personal digital assistant, a handheld device, and a workstation, routers, servers. The apparatus 800/900/1000 are communicatively coupled to the other devices (not shown) through a network (not shown).

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one implementation, the apparatus 800/900/1000 may include at least one processor 802/902/1002, an input/output (I/O) interface 804/904/1004, and a memory 806/906/1006. The at least one processor 802/902/1002 may be implemented as one or more microprocessors, microcomputers, microcontrollers, digital signal processors, central processing units, state machines, logic circuitries, and/or any devices that manipulate signals based on operational instructions. Among other capabilities, the at least one processor 802/902/1002 is configured to fetch and execute computer-readable instructions stored in the memory 806/906/1006.

The I/O interface 804/904/1004 may include a variety of software and hardware interfaces, for example, a web interface, a graphical user interface, and the like. The I/O interface 804/904/1004 may allow the apparatus 800/900/1000 to interact with a user directly or through the client devices (not shown). Further, the I/O interface 804/904/1004 may enable the apparatus 800/900/1000 to communicate with other computing devices, such as web servers and external data servers (not shown). The I/O interface 804/904/1004 can facilitate multiple communications within a wide variety of networks and protocol types, including wired networks, for example, LAN, cable, etc., and wireless networks, such as WLAN, cellular, or satellite. The I/O interface 804/904/1004 may include one or more ports for connecting a number of devices to one another or to another server.

The memory 806/906/1006 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The modules include routines, programs, objects, components, data structures, etc., which perform particular tasks or implement particular abstract data types.

In one implementation, a system for implementing a fast reroute (FRR) using a Path Computation Element Protocol (PCEP) is disclosed. The system comprises at least one ingress router 800, at least one other router 900, and at least one PCE 1000.

The ingress router may be configured to communicate at least a path computation report (PCRpt) message to at least one Path Computation Element (PCE), the PCRpt message comprise at least an information associated with a working label switched path (LSP).

The other router may be configured to communicate at least a path computation report (PCRpt) message to the PCE, the PCRpt message comprise at least an information associated with a fast reroute (FRR) LSP having an association object with an optional Type, length, value (TLV).

The PCE may be configured to communicate at least a path computation update (PCUpd) message to at least the ingress router, the PCUpd message comprise at least a newly computed LSP path for the working LSP whose traffic is affected due to link and/or node failure.

In one implementation, the optional TLV comprise at least a FRR bind TLV carrying the workings LSPs to be protected by the FRR LSP in the association object.

In one implementation, upon detection of at least another working LSP, the other router is configured to communicate at least a PCRpt message, the PCRpt message comprise at least an information associated with a fast reroute (FRR) LSP having an association object with an optional Type, length, value (TLV) and FRR Bind TLV with sub-TLV LSP identifiers of working LSP.

In one implementation, the optional TLV comprise at least a FRR bind TLV carrying the information associated along with detected working lsp to be protected by the FRR LSP in association object.

In one implementation, upon detection of a node and/or link failure, the other router is configured to communicate at least a PCRpt message, the PCRpt message comprise at least an information associated with a fast reroute (FRR) LSP having an association object with an optional Type, length, value (TLV), wherein the optional TLV includes at least a FRR flag bit specifying the FRR currently in use.

In one implementation, upon receipt of the FRR flag bit, the PCE is configured to detect at least the working LSP being protected; and communicate the PCUpd message having at least the new LSP to the Ingress router.

In one implementation, the system associates working LSP(s) with the FRR LSP and switch traffic to FRR LSP upon the link and/or node failure.

In one implementation, the optional TLVs comprises at least a FRR bind TLV and/or a FRR Flags TLV carried in the association object to communicate LSP identifiers of the working LSP(s) and the current FRR status.

In one implementation, a system for implementing a fast reroute (FRR) using a Path Computation Element Protocol (PCEP) is disclosed. The system comprises at least one ingress router 800, at least one other router 900, and at least one PCE 1000.

The Path Computation Element (PCE) may be configured to communicate at least a path computation initiate (PCInitiate) message to at least one Ingress router and/or other router, the PCInitiate message triggers creations of at least a working label switched path (LSP) at the ingress router.

The ingress router may be configured to communicate, upon receipt of the PCInitiate message, at least a path computation report (PCRpt) message to the PCE, the PCRpt message comprise at least an information associated with a working label switched path (LSP) created.

The other router, upon receipt of the a PCInitiate message for creation of at least a fast reroute (FRR) LSP, may be configured to create the least a FRR LSP; and communicate at least a path computation report (PCRpt) message to the PCE, the PCRpt message comprise at least an information associated with the fast reroute (FRR) LSP having an association object with an optional Type, length, value (TLV).

In one implementation, the PCE may be configured to receive the PCRpt message, update the working LSP to be protected based on the information associated with the working label switched path (LSP) and the information associated with the FRR LSP, and thereby communicate, upon detection of at least a link and/or a node failure, at least a path computation update (PCUpd) message to at least the ingress router, the PCUpd message comprise at least a newly computed LSP path for the working LSP whose traffic is affected due to link and/or node failure.

In one implementation, the link and/or the node failure is detected by the other router, and upon detection of the link and/or the node failure, the other router may be further configured to communicate at least a PCRpt message, the PCRpt message comprise at least an information associated with a fast reroute (FRR) LSP having an association object with an optional Type, length, value (TLV), wherein the optional TLV includes at least a FRR flag bit specifying the FRR currently in use.

In one implementation, upon receipt of the FRR flag bit, the PCE may be configured to detect at least the working LSP from the ingress router; and thereby communicate the PCUpd message having the newly computed LSP path for the working LSP whose traffic is affected due to link and/or node failure.

In one implementation, the optional TLV comprise at least a FRR bind TLV carrying the information associated with working LSPs to be protected by the FRR LSP in the association object.

In one implementation, upon detection of at least another working LSP, the PCE is configured to communicate at least a PCUpd message, the PCUpd message comprise at least an information associated with a fast reroute (FRR) LSP having an association object with an optional Type, length, value (TLV) and FRR Bind TLV with sub-TLV LSP identifiers of working LSP.

In one implementation, the optional TLV comprise at least a FRR bind TLV carrying the information associated with working LSPs to be protected by the FRR LSP in association object.

In one implementation, upon receipt of the PCUpd message triggering creation of the another working LSP, the other router is configured to communicate at least a PCRpt message, the PCRpt message comprise at least an information associated with a fast reroute (FRR) LSP having an association object with an optional Type, length, value (TLV) and FRR Bind TLV with sub-TLV LSP identifiers of working LSP received from the PCE in PCUpd message.

In one implementation, the optional TLVs comprises at least a FRR bind TLV and/or a FRR Flags TLV carried in the association object to communicate LSP identifiers of the working LSP(s) and the current FRR status.

In one implementation, an apparatus 800, preferably an ingress router, for implementing a fast reroute (FRR) using a Path Computation Element Protocol (PCEP) is disclosed. The apparatus 800 comprises a processor 802, and a memory 806 coupled to the processor 802 for executing a plurality of modules present in the memory. The plurality of modules comprises a transmitting module 812 configured to communicate at least a path computation report (PCRpt) message to at least one Path Computation Element (PCE), the PCRpt message comprise at least an information associated with a working label switched path (LSP); and a receiving module 808 configured to receive at least a path computation update (PCUpd) message from the PCE, the PCUpd message comprise at least a newly computed LSP path for the working LSP whose traffic is affected due to link and/or node failure.

In one implementation, the optional TLV comprise at least FRR flags TLV in association object.

In one implementation, the PCE is further configured to receive at least a PCRpt message from at least one other router, the PCRpt message comprise at least an information associated with a fast reroute (FRR) LSP having an association object with an optional Type, length, value (TLV), wherein the optional TLV includes at least a FRR flag bit specifying the FRR currently in use; detect at least the working LSP being protected; and transmit, upon receipt of the FRR flag bit, the PCUpd message having at least the new LSP to the Ingress router detected upon the link and/or node failure.

In one implementation, the optional TLVs comprises at least a FRR bind TLV and/or a FRR Flags TLV carried in the association object to communicate LSP identifiers of the working LSP(s) and the current FRR status.

In one implementation, an apparatus 800, preferably an ingress router, for implementing a fast reroute (FRR) using a Path Computation Element Protocol (PCEP) is disclosed. The apparatus 800 comprises a processor 802, and a memory 806 coupled to the processor for executing a plurality of modules present in the memory. The plurality of modules comprises a receiving module 808 configured to receive at least a path computation initiate (PCInitiate) message from at least a Path Computation Element (PCE), the PCInitiate message triggers creations of at least a working label switched path (LSP); a creation module 810 configured to create the working label switched path (LSP); an a transmitting module 812 configured to transmit at least a path computation report (PCRpt) message to the PCE, the PCRpt message comprise at least an information associated with the working label switched path (LSP) created; wherein upon detection of at least a link and/or a node failure, the receiving module 808 is configured to receive at least a path computation update (PCUpd) message from the PCE, the PCUpd message comprise at least a newly computed LSP path for the working LSP whose traffic is affected due to link and/or node failure.

In one implementation, the PCE is further configured to receive at least a PCRpt message from at least one other router, the PCRpt message comprise at least an information associated with a fast reroute (FRR) LSP having an association object with an optional Type, length, value (TLV), wherein the optional TLV includes at least a FRR flag bit specifying the FRR currently in use; detect at least the working LSP being protected; and transmit, upon receipt of the FRR flag bit, the PCUpd message having at least the newly computed LSP path for the working LSP whose traffic is affected due to link and/or node failure.

In one implementation, the optional TLVs comprises at least a FRR bind TLV and/or a FRR Flags TLV carried in the association object to communicate LSP identifiers of the working LSP(s) and the current FRR status.

In one implementation, an apparatus 900, preferably a Point of Local Repair (PLR), for implementing a fast reroute (FRR) using a Path Computation Element Protocol (PCEP) is disclosed. The apparatus 900 comprises a processor 902, and a memory 906 coupled to the processor 902 for executing a plurality of modules present in the memory. The plurality of modules comprises a transmitting module 908 configured to transmit at least a path computation report (PCRpt) message to at least one Path Computation Element (PCE), the PCRpt message comprise at least an information associated with a fast reroute (FRR) LSP having an association object with an optional Type, length, value (TLV); and wherein the PCE is configured to communicate at least a path computation update (PCUpd) message, the PCUpd message comprise at least a newly computed LSP path for the working LSP whose traffic is affected due to link and/or node failure.

In one implementation, the PCUpd message is communicated based on the working LSP protected by the FRR LSP received by the PCE.

In one implementation, the apparatus 900 further comprises a detection module 910 configured to detect at least another working LSP based at least on a PCUpd message received from the PCE, the PCE transmits the PCUpd message upon detection of another working LSP; and thereby communicate at least a PCRpt message to the PCE, the PCRpt message comprise at least an information associated with a fast reroute (FRR) LSP having an association object with an optional Type, length, value (TLV) and FRR Bind TLV with sub-TLV LSP identifiers of working LSP, wherein the optional TLV comprise at least a FRR bind TLV carrying the information associated with the FRR LSPs bound to the association object detected for the another working LSP.

In one implementation, the PCE is configured to receive the PCRpt message; update the working LSP to be protected based on the information associated with the working label switched path (LSP) and the information associated with the FRR LSP received; and thereby communicate, upon detection of at least a link and/or a node failure, at least a path computation update (PCUpd) message.

In one implementation, the optional TLV comprise at least a FRR bind TLV carrying the information associated with the FRR LSP bound to the association object.

In one implementation, upon detection of a node and/or link failure, the apparatus is further configured to communicate at least a PCRpt message to the PCE, the PCRpt message comprise at least an information associated with a fast reroute (FRR) LSP having an association object with an optional Type, length, value (TLV) and FRR Bind TLV with sub-TLV LSP identifiers of working LSP, wherein the optional TLV includes at least a FRR flag bit specifying the FRR currently in use.

In one implementation, upon receipt of the FRR flag bit, the PCE is configured to detect at least the working LSP to be protected; and communicate the PCUpd message having at least the newly computed LSP path for the working LSP whose traffic is affected due to link and/or node failure.

In one implementation, the optional TLVs comprises at least a FRR bind TLV and/or a FRR Flags TLV carried in the association object to communicate LSP identifiers of the working LSP(s) and the current FRR status.

In one implementation, an apparatus 1000, preferably a Path Computation Element (PCE), for implementing a fast reroute (FRR) using a Path Computation Element Protocol (PCEP) is disclosed. The apparatus 1000 comprises a processor 1002, and a memory 1006 coupled to the processor 1002 for executing a plurality of modules present in the memory. The plurality of modules comprises a receiving module 1008 configured to receive at least a path computation report (PCRpt) message, the PCRpt message comprise at least an information associated with a working label switched path (LSP); receive at least a path computation report (PCRpt) message to the PCE, the PCRpt message comprise at least an information associated with a fast reroute (FRR) LSP having an association object with an optional Type, length, value (TLV); and a transmit module 1010 configured to transmit at least a path computation update (PCUpd) message, the PCUpd message comprise at least a newly computed LSP path for the working LSP whose traffic is affected due to link and/or node failure.

In one implementation, the optional TLV comprise at least a FRR bind TLV carrying the information associated with the FRR LSPs bound to the association object.

In one implementation, the receiving module, upon detection of at least another working LSP, is further configured to receive at least a PCRpt message, the PCRpt message comprise at least an information associated with a fast reroute (FRR) LSP having an association object with an optional Type, length, value (TLV) and FRR Bind TLV with sub-TLV LSP identifiers of working LSP, the optional TLV comprise at least a FRR bind TLV carrying the information associated with the FRR LSPs bound to the association object detected for the another working LSP.

In one implementation, the receiving module is configured to receive at least at least a PCRpt message, the PCRpt message comprise at least an information associated with a fast reroute (FRR) LSP having an association object with an optional Type, length, value (TLV) and FRR Bind TLV with sub-TLV LSP identifiers of working LSP, wherein the optional TLV includes at least a FRR flag bit specifying the FRR currently in use, the FRR flag bit indicative of a node and/or link failure.

In one implementation, upon receipt of the FRR flag bit, is further configured to detect at least the working LSP to be protected based on the on the information associated with the working label switched path (LSP) and the information associated with the FRR LSP received; and communicate the PCUpd message having at least the newly computed LSP path for the working LSP whose traffic is affected due to link and/or node failure.

Figure 11:
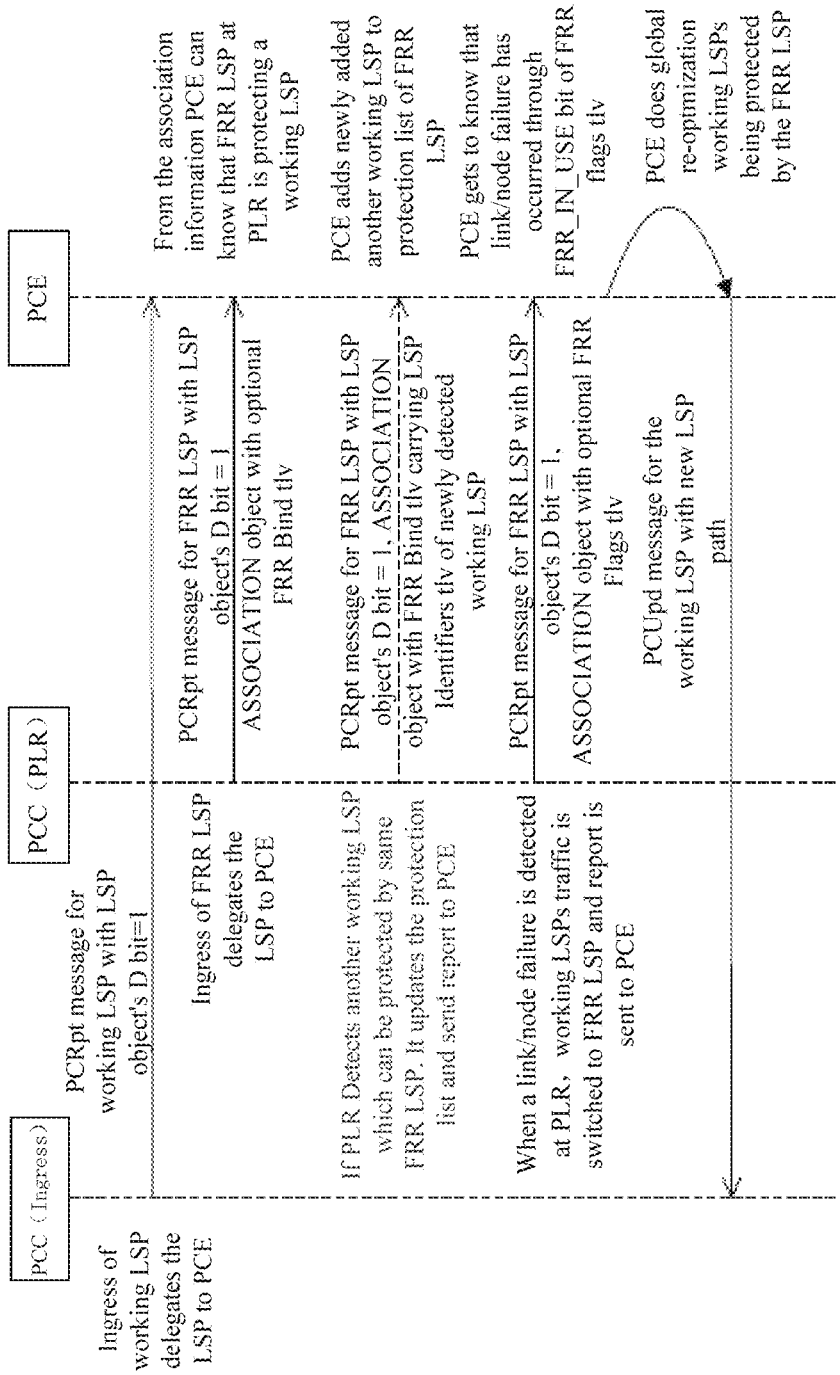
FIG. 11 illustrates a flow diagram showing working LSP and FRR LSP delegated to PCE i.e., not initiated by PCE, in accordance with an embodiment of the present subject matter.
Figure 12:
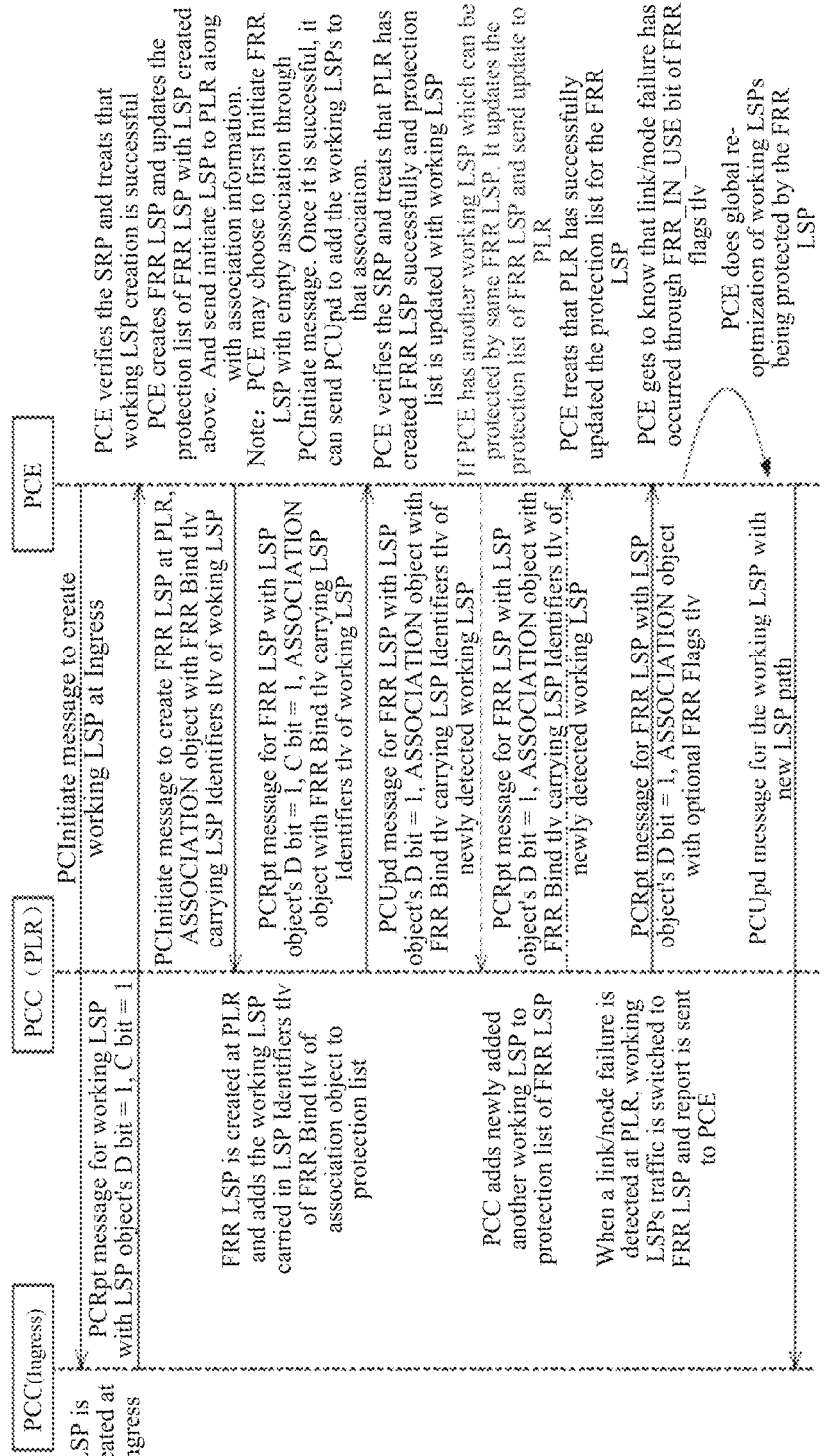
FIG. 12 illustrates a flow diagram showing working LSP and FRR LSP initiated by the PCE, in accordance with an embodiment of the present subject matter.

FIG. 11 illustrates a flow diagram showing working LSP and FRR LSP delegated to PCE i.e., not initiated by PCE, in accordance with an embodiment of the present subject matter. FIG. 12 illustrates a flow diagram showing working LSP and FRR LSP initiated by the PCE, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described apparatus 800/900/1000.

In one implementation, a method in a system for implementing a fast reroute (FRR) using a Path Computation Element Protocol (PCEP) is disclosed. The method comprises:

communicating at least a path computation report (PCRpt) message to at least one Path Computation Element (PCE), the PCRpt message comprise at least an information associated with a working label switched path (LSP);

communicating at least a path computation report (PCRpt) message to the PCE, the PCRpt message comprise at least an information associated with a fast reroute (FRR) LSP having an association object with an optional Type, length, value (TLV);

communicating, by the PCE, at least a path computation update (PCUpd) message to at least the ingress router, the PCUpd message comprise at least a newly computed LSP path for the working LSP whose traffic is affected due to link and/or node failure.

In one implementation, upon detection of at least another working LSP, further comprises communicating at least a PCRpt message, the PCRpt message comprise at least an information associated with a fast reroute (FRR) LSP having an association object with an optional Type, length, value (TLV) and FRR Bind TLV with sub-TLV LSP identifiers of working LSP.

In one implementation, upon detection of a node and/or link failure, further comprises communicate at least a PCRpt message, the PCRpt message comprise at least an information associated with a fast reroute (FRR) LSP having an association object with an optional Type, length, value (TLV) and FRR Bind TLV with sub-TLV LSP identifiers of working LSP, wherein the optional TLV includes at least a FRR flag bit specifying the FRR currently in use.

In one implementation, upon receipt of the FRR flag bit, the method further comprises detecting at least the working LSP to be protected; and communicating the PCUpd message having at least the newly computed LSP path for the working LSP whose traffic is affected due to link and/or node failure.

In one implementation, a method in a system for implementing a fast reroute (FRR) using a Path Computation Element Protocol (PCEP) is disclosed. The method comprises:
- communicating at least a path computation initiate (PCInitiate) message to at least one ingress router, the PCInitiate message triggers creations of at least a working label switched path (LSP) at the ingress router;
- communicating, upon receipt of the PCInitiate message, at least a path computation report (PCRpt) message to the PCE, the PCRpt message comprise at least an information associated with a working label switched path (LSP) created;
- creating, upon receipt of the a PCInitiate message for creation of at least a fast reroute (FRR) LSP, the FRR LSP;
- communicating at least a path computation report (PCRpt) message to at least a PCE, the PCRpt message comprise at least an information associated with the fast reroute (FRR) LSP having an association object with an optional Type, length, value (TLV);
- receiving the PCRpt message;
- updating the working LSP to be protected based on the information associated with the working label switched path (LSP) and the information associated with the FRR LSP; and
- communicating, upon detection of at least a link and/or a node failure, at least a path computation update (PCUpd) message to at least the ingress router, the PCUpd message comprise at least a newly computed LSP path for the working LSP whose traffic is affected due to link and/or node failure.

In one implementation, upon detection of the link and/or the node failure, the method further comprises communicating at least a PCRpt message, the PCRpt message comprise at least an information associated with a fast reroute (FRR) LSP having an association object with an optional Type, length, value (TLV) and FRR Bind TLV with sub-TLV LSP identifiers of working LSP, wherein the optional TLV includes at least a FRR flag bit specifying the FRR currently in use.

In one implementation, upon receipt of the FRR flag bit, the method further comprises detecting at least the working LSP to be protected by the ingress router; and thereby communicating the PCUpd message having the newly computed LSP path for the working LSP whose traffic is affected due to link and/or node failure.

In one implementation, upon detection of at least another working LSP, further comprises communicating at least a PCUpd message, the PCUpd message comprise at least an information associated with a fast reroute (FRR) LSP having an association object with an optional Type, length, value (TLV) and FRR Bind TLV with sub-TLV LSP identifiers of working LSP.

In one implementation, upon receipt of the PCUpd message triggering creation of the another working LSP, further comprises communicating at least a PCRpt message, the PCRpt message comprise at least an information associated with a fast reroute (FRR) LSP having an association object with an optional Type, length, value (TLV) and FRR Bind TLV with sub-TLV LSP identifiers of working LSP received from the PCE in PCUpd message.

In one implementation, a method performed by an apparatus, preferably an ingress router, for implementing a fast reroute (FRR) using a Path Computation Element Protocol (PCEP) is disclosed. The method comprises communicating at least a path computation report (PCRpt) message to at least one Path Computation Element (PCE), the PCRpt message comprise at least an information associated with a working label switched path (LSP); and receiving at least a path computation update (PCUpd) message from the PCE, the PCUpd message comprise at least a newly computed LSP path for the working LSP whose traffic is affected due to link and/or node failure.

In one implementation, a method performed by an apparatus, preferably an ingress router, for implementing a fast reroute (FRR) using a Path Computation Element Protocol (PCEP) is disclosed. The method comprises: receiving at least a path computation initiate (PCInitiate) message from at least a Path Computation Element (PCE), the PCInitiate message triggers creations of at least a working label switched path (LSP); creating the working label switched path (LSP); transmitting at least a path computation report (PCRpt) message to the PCE, the PCRpt message comprise at least an information associated with the working label switched path (LSP) created; and receiving, upon detection of at least a link and/or a node failure, at least a path computation update (PCUpd) message from the PCE, the PCUpd message comprise at least a newly computed LSP path for the working LSP whose traffic is affected due to link and/or node failure.

In one implementation, a method performed by an apparatus, preferably a Point of Local Repair (PLR), for implementing a fast reroute (FRR) using a Path Computation Element Protocol (PCEP) is disclosed. The method comprises transmitting at least a path computation report (PCRpt) message to at least one Path Computation Element (PCE), the PCRpt message comprise at least an information associated with a fast reroute (FRR) LSP having an association object with an optional Type, length, value (TLV); and communicating at least a path computation update (PCUpd) message, the PCUpd message comprise at least a newly computed LSP path for the working LSP whose traffic is affected due to link and/or node failure.

In one implementation, a method performed by an apparatus, preferably a Path Computation Element (PCE), for implementing a fast reroute (FRR) using a Path Computation Element Protocol (PCEP), is disclosed. The method comprises: receiving at least a path computation report (PCRpt) message, the PCRpt message comprise at least an information associated with a working label switched path (LSP); receiving at least a path computation report (PCRpt) message to the PCE, the PCRpt message comprise at least an information associated with a fast reroute (FRR) LSP having an association object with an optional Type, length, value (TLV); and transmitting at least a path computation update (PCUpd) message, the PCUpd message comprise at least a newly computed LSP path for the working LSP whose traffic is affected due to link and/or node failure.

Apart from what is disclosed above, according to the implementation of the present disclosure, the PCE FRR may be used in the below scenarios to associate working LSPs with a FRR LSP to protect against the node/link failures, and may switch the traffic immediately upon LSP failure:
Scenario 1: PCE initiated LSP
Scenario 2: PCC delegated LSP
Scenario 3: PCE CC (PCE Central Controller) in CR-LSP mode Apart from what is explained above, the present disclosure also include the below mentioned advantages:

By the implementation of the present disclosure, a carrier grade time critical services can be deployed using PCEP.

By the implementation of the present disclosure, a PCEP can be used in SDN network with faster convergence.

By the implementation of the present disclosure, FRR protection is managed and controlled from central SDN controller.

A person of ordinary skill in the art may be aware that in combination with the examples described in the embodiments disclosed in this specification, units and algorithm blocks may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the blocks of the methods described in the embodiment of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Although implementations for system, method and apparatus for implementing fast reroute (FRR) have been described in language specific to structural features and/or methods, it is to be understood that the appended claims are not necessarily limited to the specific features or methods described. Rather, the specific features and methods are disclosed as examples of implementations of system, method and apparatus for implementing fast reroute (FRR).

We claim:

1. A system for implementing a fast reroute (FRR) using a Path Computation Element Protocol (PCEP), the system comprising: a Path Computation Element (PCE) comprising a processor and a memory, and an ingress router, the Path Computation Element (PCE) being configured to:
communicate a path computation initiate (PCInitiate) message to the ingress router wherein the PCInitiate message triggers creations of a working label switched path (LSP) at the ingress router;

the ingress router being configured to:
communicate, upon receipt of the PCInitiate message, a first path computation report (PCRpt) message to the PCE, the first PCRpt message comprising first information associated with the created working LSP;

wherein the PCE is configured to:
receive the PCRpt message;
update the working LSP to be protected based on the information associated with the working label switched path (LSP) and the information associated with an FRR LSP; and
communicate, upon detection of a failure, a path computation update (PCUpd) message to the ingress router, the PCUpd message comprising a newly computed LSP path for the working LSP whose traffic is affected due to the failure.

2. The system of claim 1, wherein, upon receipt of an FRR flag bit, the PCE is configured to:
detect that the working LSP is protected; and
communicate the PCUpd message having the newly computed LSP path for the working LSP whose traffic is affected due to the failure.

3. The system of claim 1, wherein, upon detection of at least another working LSP, the PCE is configured to communicate the PCUpd message, the PCUpd message comprising third information associated with a fast reroute (FRR) LSP having an association object comprising an optional Type, length, value (TLV) and an FRR Bind TLV comprising sub-TLV LSP identifiers of the working LSP.

4. The system of claim 3, wherein the optional TLV comprises one or more of a FRR bind TLV or a FRR Flags TLV carried in the association object to communicate LSP identifiers of the working LSP and a current FRR status.

5. The system of claim 1, wherein the ingress router associates working LSPs with the FRR LSP and switch traffic to the FRR LSP upon the failure.

6. An apparatus for implementing a fast reroute (FRR) using a Path Computation Element Protocol (PCEP), the apparatus comprising:
a memory, configured to store computer-readable instructions; and
a processor, configured to execute the computer-readable instructions to:
transmit a path computation report (PCRpt) message to a Path Computation Element (PCE), the PCRpt message comprises first information associated with a fast reroute (FRR) label switched path (LSP) having an association object carrying an optional Type, length, value (TLV); and
wherein the PCE is configured to communicate a path computation update (PCUpd) message to an ingress router, the PCUpd message comprises a newly computed LSP path for a working LSP whose traffic is affected due to a failure.

7. The apparatus of claim 6, wherein in a case of PCE initiated LSPs, the PCUpd message is sent by the PCE to the apparatus to communicate the working LSP being protected by the FRR LSP.

8. The apparatus of claim 6, wherein upon detection of the failure, the apparatus is further configured to:
communicate the PCRpt message to the PCE, the PCRpt message comprises at least information associated with a fast reroute (FRR) LSP having an association object comprising an optional Type, length, value (TLV) and a FRR Bind TLV comprising sub-TLV LSP identifiers of the working LSP, wherein the optional TLV in the association object includes at least a FRR flag bit specifying an FRR currently in use.

9. The apparatus of claim 8, wherein upon receipt of the FRR flag bit, the PCE is configured to:
detect that the working LSP is protected; and
communicate the PCUpd message comprising the newly computed LSP path for the working LSP whose traffic is affected due to the failure.

10. The apparatus of claim 6 wherein the processor is further configured to execute the computer-readable instructions to associate one or more working LSPs with the FRR LSP and switch traffic to the FRR LSP upon the failure.

11. The apparatus of claim 6, wherein the optional TLV comprises one or more of a FRR bind TLV or a FRR Flags TLV carried in the association object to communicate LSP identifiers of the working LSP and a current FRR status.

12. The apparatus of claim 6, wherein the processor is further configured to execute the computer-readable instructions to:
receive one or more of the PCUpd message or a PCInitiate message from the PCE.

13. An apparatus for implementing a fast reroute (FRR) using a Path Computation Element Protocol (PCEP), the apparatus comprising:
a memory, configured to store computer-readable instructions; and
a processor, configured to execute the computer-readable instructions to:
receive a first path computation report (PCRpt) message, the first PCRpt message comprises first information associated with a working label switched path (LSP);
receive a second path computation report (PCRpt) message, the second PCRpt message comprises second information associated with a fast reroute (FRR) LSP comprising an association object comprising an optional Type, length, value (TLV); and
transmit a path computation update (PCUpd) message to an ingress router, the PCUpd message comprises a newly computed LSP path for a working LSP whose traffic is affected due to a failure.

14. The apparatus of claim 13, wherein the optional TLV comprises a FRR bind TLV comprising the information associated with the working LSP to be protected by the FRR LSP in the association object.

15. The apparatus of claim 13, wherein the processor is configured to execute the computer-readable instructions to receive the PCRpt message, the PCRpt message comprises third information associated with a fast reroute (FRR) LSP comprising an association object comprising an optional Type, length, value (TLV) and FRR Bind TLV comprising sub-TLV LSP identifiers of the working LSP, wherein the optional TLV comprises at least one FRR flag bit indicating an FRR currently in use, the at least one FRR flag bit indicative of the failure.

16. The apparatus of claim 15, upon receipt of the FRR flag bit, the processor is further configured to execute the computer-readable instructions to:
detect that the working LSP is to be protected based on the first information associated with the working label switched path (LSP) and the second information associated with the FRR LSP; and
communicate the PCUpd message to the ingress router having the newly computed LSP path for the working LSP whose traffic is affected due to the failure.

17. The apparatus of claim 13, wherein in case of a Path Computation Element (PCE) initiated FRR LSP, the processor is further configured to execute the computer-readable instructions to transmit a PCUpd message to at least the Point of Local Repair (PLR) to add a new working LSP to an existing association group.

* * * * *